(12) United States Patent
McGill

(10) Patent No.: US 6,318,489 B1
(45) Date of Patent: Nov. 20, 2001

(54) GROUND EFFECT MACHINE

(75) Inventor: Daniel M. McGill, 869 W. 9th St., San Jacinto, CA (US) 92583-3852

(73) Assignee: Daniel M. McGill, San Jacinto, CA (US)

( * ) Notice: Subject to any disclaimer, the term of this patent is extended or adjusted under 35 U.S.C. 154(b) by 0 days.

(21) Appl. No.: 09/557,936

(22) Filed: Apr. 21, 2000

Related U.S. Application Data

(60) Provisional application No. 60/130,346, filed on Apr. 21, 1999.

(51) Int. Cl.[7] ............................. B60B 39/00; B60V 1/04
(52) U.S. Cl. ........................... 180/164; 180/116; 180/125
(58) Field of Search ................................ 180/164, 116, 180/127, 128, 125, 121, 901; 114/292, 61.12, 61.25, 360, 125, 67 A

(56) References Cited

U.S. PATENT DOCUMENTS

| | | | |
|---|---|---|---|
| 3,246,711 | * | 4/1966 | Snoeyenbos ........................ 180/164 |
| 3,266,757 | * | 8/1966 | Guienne . | |
| 3,268,023 | * | 8/1966 | Di Napoli ........................... 180/164 |
| 3,685,607 | * | 8/1972 | Eglen .................................. 180/116 |
| 3,892,287 | * | 7/1975 | Bennett .............................. 180/164 |
| 4,240,773 | * | 12/1980 | Terry .................................. 180/125 |
| 5,014,803 | * | 5/1991 | Urakami ............................. 180/164 |
| 6,102,145 | * | 8/2000 | Fisher ................................. 180/164 |

FOREIGN PATENT DOCUMENTS

| | | | |
|---|---|---|---|
| 782892 | * | 4/1968 | (CA) .................................. 180/125 |
| 404166480 | * | 6/1992 | (JP) .................................... 180/164 |

* cited by examiner

Primary Examiner—Anne Marie Boehler
(74) Attorney, Agent, or Firm—Glenn J. Perry; James Y. Sze; Pillsbury Winthrop LLP

(57) ABSTRACT

A novel Ground Effect Machine capable of operating in low airflow and low air-pressure conditions. By using an air bladder, partially filed with liquid, in lieu of a skirt, the invention is able to reduce airflow, and consequently maximize the lift provided by air pressure pump, thus minimizing the amount of air pressure required. In addition, by alternating between positive and negative air pressure within a pressure chamber beneath the ground effect machine, the invention may lift and transport heavy loads or securely fasten the ground effect machine to the floor surface.

23 Claims, 5 Drawing Sheets

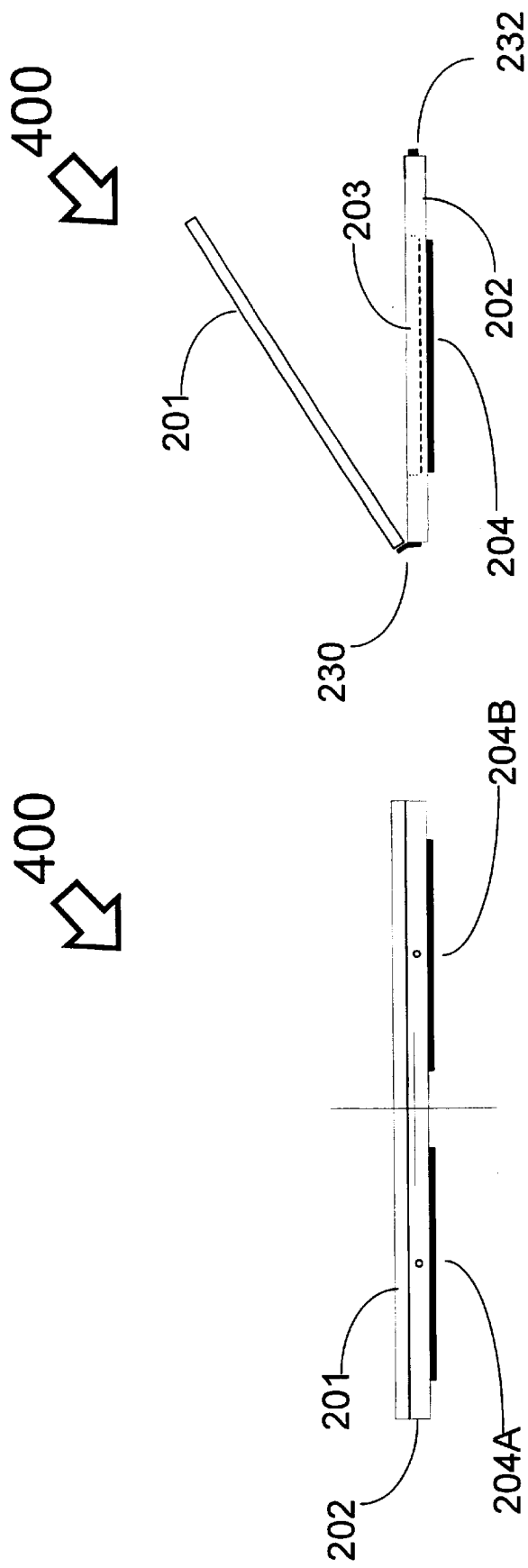

GROUND EFFECT MACHINE

This appln claims benefit of Prov. No. 60/130,346 filed Apr. 21, 1999.

BACKGROUND

I. Field of the Invention

The aspects of the present invention relate to Ground Effect Machines (GEM) to transport, locate, and intermittently position loads. More specifically, the embodiments of the present invention relate to a novel Ground Effect Machine capable of bearing loads including equipment, goods and materials which are being manufactured and/or transported. When used as a positive pressure device, the GEM generates a cushion of air that floats a load from one point to another. When used as a negative pressure device, the GEM securely fixes a load to a surface by creating and maintaining a vacuum.

II. Description of the Related Art

The problem of transporting devices, equipment, cargo, goods, and materials has been with us for a long time. Various methods of transporting loads and then fixing them at a predetermined position have been devised with varying success.

Wheeled dollies, wheeled cart devices, pallet trucks, and various configurations of industrial lift trucks are in widespread use for transporting loads. However, once the load is brought to its desired location, the load must be removed from the cart or industrial lift truck; with respect to equipment intermittently positioned, such equipment must bolted or otherwise temporarily fixed to a location. This can be a time-consuming and complicated logistical problem.

A well-known system used in storage and transportation is the wooden pallet, which is transported by conventional forklift equipment. A forklift operator moves the fork beneath the pallet, lifts the pallet and then moves the pallet from location to location. Wooden pallets have many disadvantages. First, wooden pallets are subject to breakage, exposing sharp wooden edges and corners. The pallets are relatively heavy. Because of their weight and bulk, the pallets are difficult for an individual person to carry from point to point. One of the biggest disadvantages of using a wooden pallet is the fact that it must be used with a forklift, which is a bulky, cumbersome and expensive piece of equipment. Pallets must frequently be moved from commercial transport vehicles onto loading docks, and vice versa, meaning that at every loading dock a forklift must be present, unless the trucker can carry a forklift on the truck, which itself is an inefficient use of space and fuel.

In the case of U.S. Pat. No. 3,948,344, "Low cost planar air pallet material handling system," issued on Apr. 6, 1976 to Johnson et al., and U.S. Pat. No. 4,815,926, "Air pallet and materials moving system," issued on Mar. 28, 1989 to Chaffee et al., these patents teach the use of air pallets that incorporate an air bearing, film, or cushion between the bottom of the pallet and the floor supporting the pallet. This reduces friction between the pallet and the underlying floor to the point that the pallet, along with its load, can be moved along the floor or other ground surface with relative ease. Some air cushion pallets were relatively bulky and heavy since the means for supplying pressurized air to the pallet was relatively crude and took up a great deal of valuable space on the pallet itself Moreover, air pallets rely on the constant flow of air to reduce the friction between the floor surface and the pallet, thus requiring high airflow to maintain lift. Another problem with air pallets is that the air cushion established by the pressurized air between the bottom surface of the pallet and the underlying support such as the floor may be maintained only where there is continuity in the floor surface itself and the presence of cracks, or irregularities in the floor result in the loss of the air cushion and the elimination of the frictional support.

Various air cushion vehicles have been contemplated for this type of use. As shown in FIG. 1, an air cushion vehicle 100 is essentially a high-speed fan or high air pressure source 102 inside a receiver 104. The air pressure source 102 forces air through multiple holes 106 in the receiver 102. This air is captured by the air skirt 108 and the subsequent lift provided reduces the friction across the floor. Such transport systems are contemplated by U.S. Pat. No. 4,060,147, "Vehicles riding on air cushions" issued on Nov. 29, 1977 to Guinne et al. and U.S. Pat. No. 4,396,082, "Air cushion vehicles" issued on Aug. 2, 1983 to Herrouin et al. The problem with such systems is that they require relatively high airflow rates attributed to the air skirt 108, which forms an inadequate air seal with the floor. The escaping air reduces the lift provided by the air, and thus needs replenishment by the air source 102. Maintaining the high amount of air flow often requires heavy, expensive and often noisy machinery. Air cushion vehicles fail to solve the problem of fixing its load in place, requiring bolting, clamping, or other solution to solve this problem.

Other cargo transport systems limit their usefulness by requiring a large amount of infrastructure. For example, a system disclosed in U.S. Pat. No. 5,253,590 "Ultra high-speed pneumatic transportation system," issued on Oct. 19, 1993 to Marusak, requires moving people and cargo through a pneumatic tube in vehicles requiring a variable-speed motor using a high-speed air stream generator. This effectively limits this particular solution to situations where the expensive tubing is already present.

SUMMARY OF THE INVENTION

An embodiment of the present invention provides a Ground Effect Machines (GEM) for transporting, locating and intermittently positioning a load. It is a novel structural arrangement for a Ground Effect Machine capable of bearing loads including equipment, goods and materials which are being manufactured of transported and to transport and secure manufacturing equipment. Unlike known devices which rely on high airflow or high air pressure, our arrangement relies on minimal airflow at low air pressure. An air bladder prevents escape of air from beneath our GEM. Thus, only a small amount of air pressure is necessary to lift and transport heavy loads. The air bladder serves as an air seal between our GEM and the ground.

Our GEM includes an air platform containing at least one pressure chamber beneath the air platform, connected to an air valve, and an air bladder contacting the edge of the pressure chamber. In some embodiments, an air injector capable of pressurizing or depressurizing the pressure chamber is connected to the pressure chamber. The air injector may be internal or external to the air platform. An example of an external air injector could simply be a portable vacuum cleaner, operating in reverse, attached to an air intake. A manifold within the pressure chamber can control the rate of flow from the air injector into the pressure chamber. To effectively seal the air within the pressure chamber, the air bladder is partially inflated by a gas. To help facilitate the seal, the air bladder may be at least 20% partially filled by a liquid. In some instances, this liquid may be water. The air bladder may be of any shape known the art, including circular or tubular bladders. When constructed of an elastomeric material the air bladder maintains a better air seal with the ground. Air platform may be constructed of metals or non-metallic materials.

In an alternate embodiment of the invention, our GEM comprises an air platform containing at least one pressure chamber beneath the air platform, a circular or tubular air bladder, an air injector, and a manifold. The air bladder lines the edge of the pressure chamber, and is partially filled by a combination of gas and liquid. The liquid partially fills at least 20% of the air bladder, to help maintain the seal between the pressure chamber and the floor. An air injector, capable of pressurizing or depressurizing the pressure chamber, is connected to the pressure chamber. A manifold within the pressure chamber controls the rate of airflow from the air injector. Air platforms may be constructed of metals or non-metallic materials. A second air injector system may create and sustain negative air pressure within the pressure chambers.

In another embodiment of the invention, our GEM includes an air platform containing a plurality of pressure chambers beneath the air platform, an air bladder, an air injector connected to the pressure chamber, and an array of interchangeable manifold components to control the rate of flow from the air injector into and out of the pressure chambers. The purpose of the air bladder is to seal the air in the pressure chamber from the outside air. Consequently, the air bladder lines the edge of each pressure chamber. To more securely seal the pressure chamber, the air bladder is partially filled by a combination of gas and liquid and the liquid partially fills at least 20% of the air bladder. The partial inflation of the air bladder allows the bladder to more securely match the surface of the ground. Air bladders may be any shape known in the art, including circular or tubular in shape. The air injector pressurizes or depressurizes the pressure chamber, to alternate the ground effect machine from a positive air pressure mode or negative air pressure mode. An interchangeable array manifold regulates the airflow from the air injector to the pressure chamber. In some embodiments of the invention, a second air injector system creates and sustains a negative air pressure within the pressure chambers. The pressure chambers may be interconnected to help stabilize the air pressure between chambers. The air platform may have a lid that allows access to the pressure chambers from above.

When used in a positive air pressure mode, our GEM generates a cushion of air upon which a load is floated from one point to another. When used in negative air pressure mode, our GEM securely fixes a load on a surface using a vacuum within a pressure chamber. The vacuum is created by using an air injector to remove the air from the pressure chamber. A system of air valves can be used to maintain such a vacuum so that the air injector is not in constant use.

BRIEF DESCRIPTION OF THE DRAWINGS

The features, objects and advantages of the embodiments of the present invention will become more apparent from the detailed description set forth below when taken in conjunction with the drawings in which like reference characters identify correspondingly throughout and wherein:

FIGS. 4A–C are a top, side, and edge view of an embodiment of the present invention with multiple pressure chambers.

DETAILED DESCRIPTION

Reference will now be made in detail to the embodiments of the invention, examples of which are illustrated in the accompanying drawings. While the invention will be described in conjuction with the embodiments, it will be understood that they are not intended to limit the invention to those embodiments. On the contrary, the invention is intended to cover alternatives, modifications and equivalents, which may be included within the spirit and scope of the invention as defined by the appended claims.

Unlike the prior art air cushion vehicles or prior art ground effect machines that rely on high airflow or high air pressure, the embodiments of the invention rely on the concept of minimal airflow, which results in the need for low air pressure. An air bladder prevents escape of air from beneath the invention, thus only a small amount of air pressure is necessary to lift and transport heavy loads. Thus, the air bladder serves as an air seal between the ground effect machine of the present invention and the ground. The use of air pressure to lift a load by the ground effect machine is referred to as using the embodiment in a "positive air pressure mode." In addition, by reversing the air pressure beneath the ground effect machine, i.e. using the embodiment in a "negative air pressure mode" the vacuum created beneath the ground effect machine can effectively secure the embodiment to any smooth ground surface, much like a suction-cup is secured to a smooth surface. By alternating between these two modes of operation, a ground effect machine of the present invention can alternatively be able to move heavy loads or secure them in a fixed place.

Figure 1:
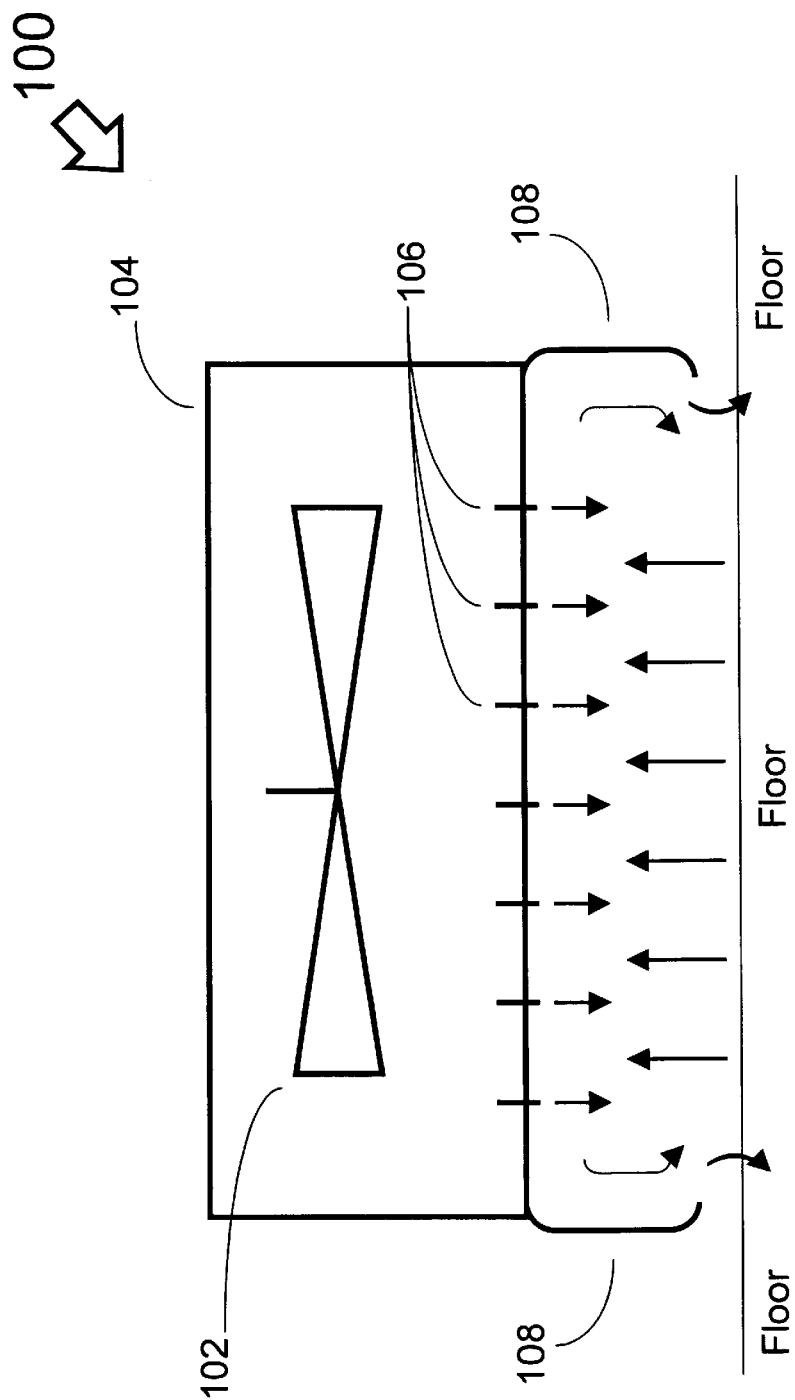
FIG. 1 is a cross-section of an air cushion vehicle 100 as is known in the PRIOR ART.
Figure 2:
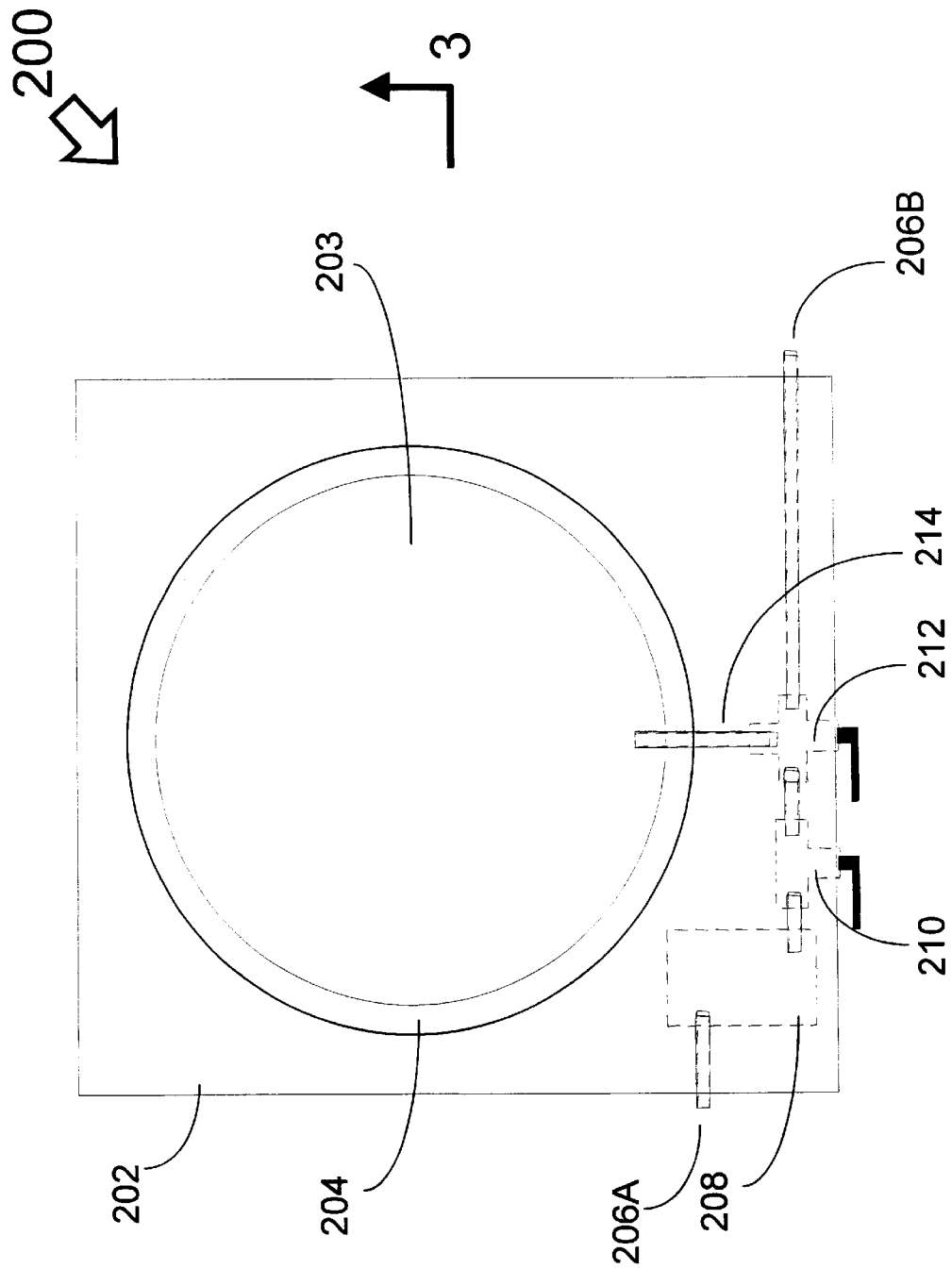
FIG. 2 is a top-view of a Ground Effect Machine embodiment of the present invention.

As shown the top-level diagram in FIG. 2, in its simplest embodiment, the ground effect machine 200 is comprised of an air platform 202 that has a pressure chamber 203. The pressure chamber 203 is used to hold the air necessary to levitate the platform and reduce the friction between the ground effect machine and the floor surface. Air platforms 202 may be of any material known in the art, including metals, non-metals, composites, or even wood. The use of non-metallic materials in constructing the air platform can be advantageous when the ground effect machine 200 is intended for an application where electrical sparking is a problem. The material used to construct the air platform 202 is not important per se, but the structural integrity of the invention depends upon the air platform's strength and ability to prevent the escape of the pressurized air within the pressure chamber 203. An air bladder 204 seals air within the pressure chamber 203.

Figure 3:
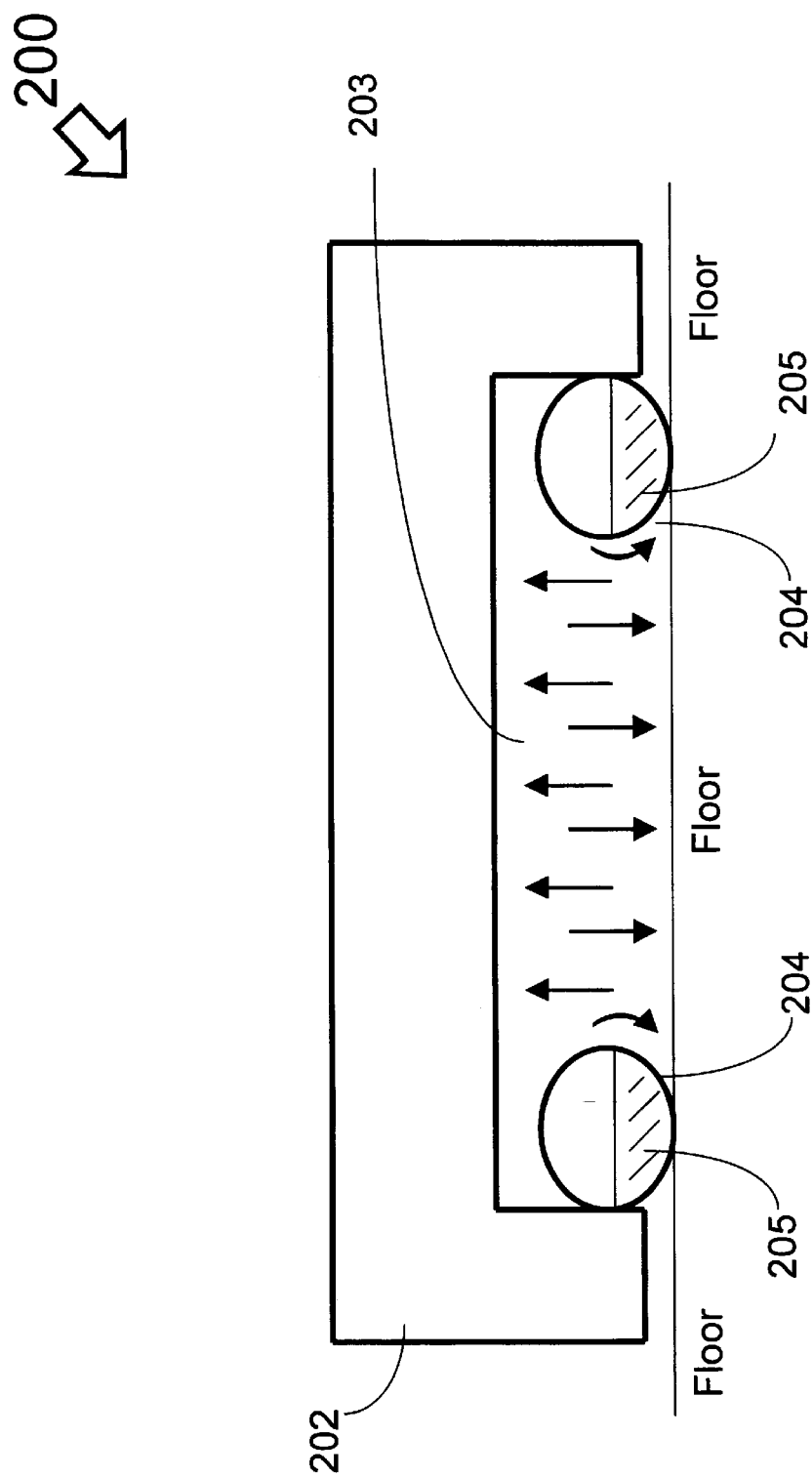
FIG. 3 is a cross-sectional view of a Ground Effect Machine embodiment in FIG. 2.

The the air bladder 204 prevents the leakage of air from the pressure chamber. Unlike prior art air skirts 108, the air bladder 204 more effectively seals air between a floor surface and pressure chamber because it does not rely upon inflation from the working fluid as is the case with an inflatable air skirt 108. This is better shown in FIG. 3, which illustrates the contact made between the floor surface and the air bladder 204. Preferably, the air bladder 204 is constructed of a resilient material, such as vulcanized rubber, or any elastomeric material, that minimizes friction between its surface and the floor, yet is flexible enough to adjust its shape to the floor surface. Consequently, the air bladder 204 itself should be partially under-inflated with a compressible gas to provide flexibility, yet be partially filled with a liquid, such as water, to provide enough mass and effectively seal the pressure chamber 203 from the outside air. From experimentation, it was discovered that filling an air bladder 204 with less than 20–25% (by volume of the air bladder 204) water proved to be ineffective, and that greater amounts of water were needed to effectively seal the pressure chamber 203. Conversely, completely filling the air bladder 204 with water made the air bladder 204 too rigid and added too much mass to the ground effect machine 200.

The shape of the air bladder 204 may vary with the size of the pressure chambers 203. The cross-sectional shape of the air bladder 204 can be any known in the art, including circular, tubular, square, rectangular, or oblong. The important part is that it is able to form an effective seal between the pressure chamber and the floor surface. Similarly, the top-view shape of the pressure chamber 203/air bladder 204 can be any shape known in the art. A circular shape is preferred because it maximizes the pressure chamber 203 surface area while minimizing the amount of material used in constructing the air bladder 204. The goal is to maximize the working areas of the ground effect machine 200 pressure chambers 203 while simultaneously minimizing the contact (drag) surface area.

Returning to FIG. 2, an air intake 206A provides air to an air injector 208. The air injector 208 may be any device known in the art for delivering pressurized air, such as an air pump, or a pressurized air tank. When a vacuum valve 210 is opened, pressurized air from air injector 208 reaches an air release valve 212. The air release value 212 in turn either allows the pressurized air to pass through an airflow distribution manifold 214 and into the pressure chamber 203, or exit the system through another air-intake 206B. Note that it is not necessary for the air injector 208 to be internalized as part of the ground effect machine 200. In some embodiments of the present invention, an air injector 208 may be external to the ground effect machine 200, and attached only when the ground effect machine is being used or changed from a positive to negative air pressure mode, or vice versa. Similarly, depending upon the size of the ground effect machine, multiple internal or external air injector 208 systems may be used.

Figure 4A:
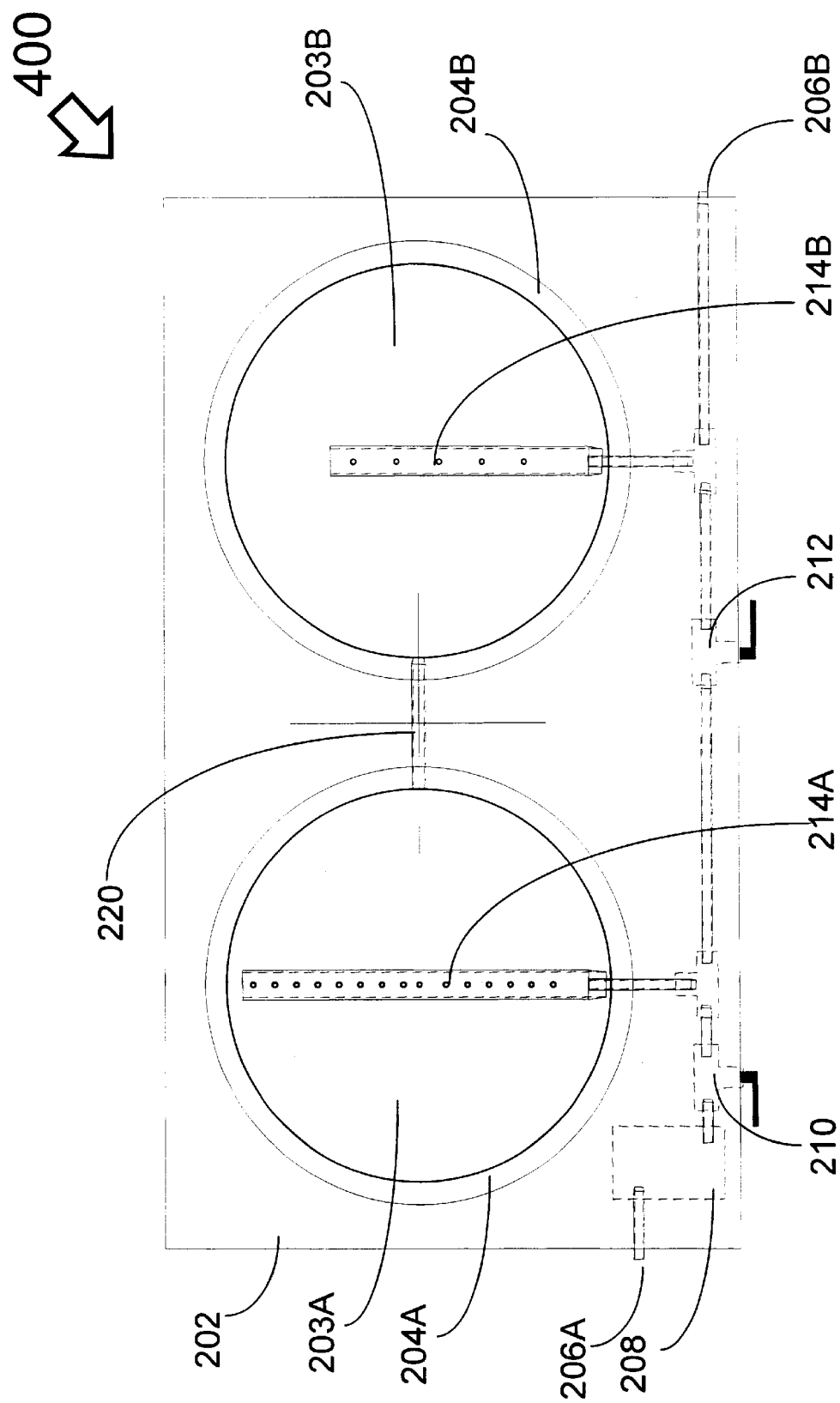

In another embodiment of the present invention can be seen in FIGS. 4A–C, a ground effect machine 400 is shown with multiple pressure chambers 203A–B. As discussed above, this example is for illustrative purposes only, and it is understood that this example does not limit the invention to the embodiment discussed below. It is clear that a plurality of pressure chambers 203 can be used, and that the size and shape of the pressure chambers 203 (and accompanying air bladders 204) can be varied.

In an invention embodiment with multiple pressure chambers 203, the operation and function of the invention is similar to that of the single pressure chamber 203 embodiment. As shown in FIG. 4A, an air platform 202 contains multiple pressure chambers 203 A–B. The pressure chamber 203 is used to hold the air necessary to levitate the platform and reduce the friction between the ground effect machine and the floor surface. In some embodiments of the invention, a crossover conduit 220 may link the pressure chambers 203A–B to equalize air pressure among the various pressure chambers 203A–B. For each pressure chamber 203, an air bladder 204 seals air within the pressure chamber 203. An air intake 206A provides air to an air injector 208. The air injector 208 may be any device known in the art for delivering pressurized air, such as an air pump, or a pressurized air tank. When a vacuum valve 210 is opened, pressurized air from air injector 208 reaches an air release valve 212. The air release value 212 in turn either allows the pressurized air to pass through an airflow distribution manifold 214A–B and into the pressure chamber 203A–B, or exit the system through another air-intake 206B. As seen in FIG. 4, a variety of manifolds 214 can be chosen, depending upon the airflow rate desired. A high flow distribution manifold is shown as element 214A, and a low flow distribution manifold is shown as element 214B. Depending upon the application, these manifolds can be changed, due to their interchangeable National Pipe Thread (referred to in the art as "NPT") connections.

FIG. 4B shows a side view of the ground effect machine 400 embodiment of FIG. 4A. As shown, an access lid 201 lies on top of the air platform 202. Moving to FIG. 4C, the access lid 201 opens on a hinge 230 to allow technicians to access to a pressure chamber 203 and air bladder 204 without turning the ground effect machine on its side. During operation of the ground effect machine, the access lid 201 is securely held in place by a latch 232. The latch 230 can be any latch known in the art that securely holds the access lid 201 in place. The access lid must be securely held in place to prevent air loss from the pressure chamber 203.

It is now worth turning to the operation of the ground effect machines of the present invention. In operation, the ground effect machines 200 of the present invention can be used in two different modes of operation: as a positive air pressure device, or as a negative air pressure device.

When an object or load needs to be transported, the ground effect machine 200 is used as a positive air device. When used as a positive air device, the ground effect machine 200 is adjusted so that positive air pressure from the air injector 208 flows to the pressure chamber 203. The vacuum valve 210 and air release valve 212 are switched to direct airflow from the air injector 208 through to the pressure chamber 203. Since the air bladder 204 prevents air escape from the pressure chamber 203, only a small amount of air pressure is needed to provide lift to reduce the frictional contact with the floor. The vacuum valve 210 is then shut, and the lift is maintained without the use of the air injector 208. Because the air bladder 204 is flexible, the presence of cracks, or irregularities in the floor does not seriously adversely effect the function of the ground effect machine 200. As long as the floor surface is relatively smooth, such as a paved or asphalt surface, the invention 200 should function adequately, in contrast to air cushion devices of the prior art 100. Once in operation as a positive air device, the ground effect machine 200 can be pushed or pulled with relative ease.

Once the ground effect machine 200 is transported to its desired location, it can be fixed into place by switching the ground effect machine into use as a negative air pressure device. When used as a negative air pressure device, the ground effect machine 200 is adjusted so that negative air pressure (a vacuum) is created and maintained in the pressure chamber 203. Initially, the air release valve 212 is switched to direct airflow from the pressure chamber through to the air intake 206B. Once this is done, the pressure chamber is emptied, equalizing the air pressure between the pressure chamber and the outside air. Equalizing the air pressure removes the lift associated with the ground effect machine's use as a positive air device. The air release valve 212, is the closed and both the vacuum valve 210 and air release valve 212 are switched to direct airflow from the pressure chamber 203 through to the air injector 208. The air injector 208 is operated in reverse, as a vacuum pump. In some embodiments of the invention, a separate air injector (not shown) may be used to remove air from the pressure chamber 203. Since the air bladder 204 prevents air escape from the pressure chamber 203, the resulting vacuum seals the ground effect machine 200 to the floor. The vacuum valve 210 is then switched shut, and the vacuum can be maintained without the operation of the, air injector 208. Because the air bladder 204 is flexible, the presence of cracks, or irregularities in the floor does not seriously adversely effect the vacuum function of the ground effect machine 200. Once in operation as a negative air device, the ground effect machine 200 is fixed in place by the vacuum, much like a suction cup is stuck to a surface.

With its positive and negative air pressure modes, a ground effect machine of the present invention has a wide variety of applications. The following applications are suggestions not intended to limit the spirit or scope of defined by the appended claims. Indeed, it is understood that the present invention could be used virtually any application requiring transportation or securing of a load on a relatively smooth surface.

Small ground effect machines of the present invention may be used atop a workbench, or similar support to move and fasten machine tools and other devices. In fact, the entire workbench or similar support may have a ground effect machine of the present invention as its base; such an application would enable a portable workbench.

Medium-sized ground effect machines may be used to transport any materials, solid, liquid, or gaseous, that any conventional transport device would carry, but have the added benefit of being able to be easily secured by a ground effect machine in negative air pressure mode.

Loading and unloading commercial transport vehicles could be done via a ground effect machine. Again, a ground effect machine in negative air pressure mode would secure loads in a transport vehicle interior.

What is claimed is:

1. A ground effect machine comprising:
   an air platform containing at least one pressure chamber beneath the air platform,
   an air bladder, partially filled by at least 20% liquid, contacting the edge of the pressure chamber, and
   an air valve connected to the pressure chamber.

2. The ground effect machine of claim 1 further comprising:
   an air injector, capable of pressurizing or depressurizing the pressure chamber, connected to the pressure chamber via the air valve.

3. The ground effect machine of claim 2 wherein the air injector is internal to the air platform.

4. The ground effect machine of claim 2 wherein the air injector is external to the air platform.

5. The ground effect machine of claim 2 further comprising:
   a manifold within the pressure chamber that controls the rate of flow from the air injector.

6. The ground effect machine of claim 1 wherein the air bladder is partially inflated by a gas.

7. The ground effect machine of claim 1 wherein the liquid is water.

8. The ground effect machine of claim 1 wherein the air bladder circular or tubular.

9. The ground effect machine of claim 1 wherein the air bladder is constructed of an elastomeric material.

10. The ground effect machine of claim 1 wherein the air platform is constructed of a metal.

11. The ground effect machine of claim 1 wherein the air platform is constructed of a non-metallic material.

12. A ground effect machine comprising:
    an air platform containing at least one pressure chamber beneath the air platform;
    a circular or tubular air bladder lining the edge of the pressure chamber, wherein the air bladder is partially filled by a combination of gas and liquid and the liquid partially fills at least 20% of the air bladder;
    an air injector connected to the pressure chamber, capable of pressurizing or depressurizing the pressure chamber, and
    a manifold within the pressure chamber that controls the rate of flow from the air injector.

13. The ground effect machine of claim 12 wherein the air platform is constructed of a metal.

14. The ground effect machine of claim 12 wherein the air platform is constructed of a non-metallic material.

15. The ground effect machine of claim 12 wherein a second air injector system creates and sustains negative air pressure within the pressure chamber.

16. A ground effect machine comprising:
    an air platform containing a plurality of pressure chambers beneath the air platform;
    an air bladder lining the edge of each pressure chamber, wherein the air bladder is partially filled by a combination of gas and liquid and the liquid partially fills at least 20% of the air bladder;
    an air injector connected to the pressure chamber, capable of pressurizing or depressurizing the pressure chamber, and
    an array of interchangeable manifold components controls the rate of flow from the air injector into and out of the pressure chambers.

17. The ground effect machine of claim 16 wherein the air bladder circular or tubular.

18. The ground effect machine of claim 17 wherein a second internal air injector system creates and sustains a negative air pressure within the pressure chambers.

19. The ground effect machine of claim 17 wherein the pressure chambers are interconnected.

20. The ground effect machine of claim 19 wherein the air platform has a lid that allows access to the pressure chambers.

21. A method of securing a ground effect machine comprising:
    creating a vacuum within a pressure chamber, the pressure chamber being surrounded with an air bladder partially filled by at least 20% liquid.

22. The method of securing a ground effect machine of claim 21 wherein the vacuum is created by using an air injector to remove air from the pressure chamber.

23. The method of securing a ground effect machine of claim 22 further comprising:
    using a system of valves to maintain the vacuum.

* * * * *